Dec. 23, 1924.
H. E. BECKWITH
FISHING TILT
Filed Feb. 28, 1923
1,520,556
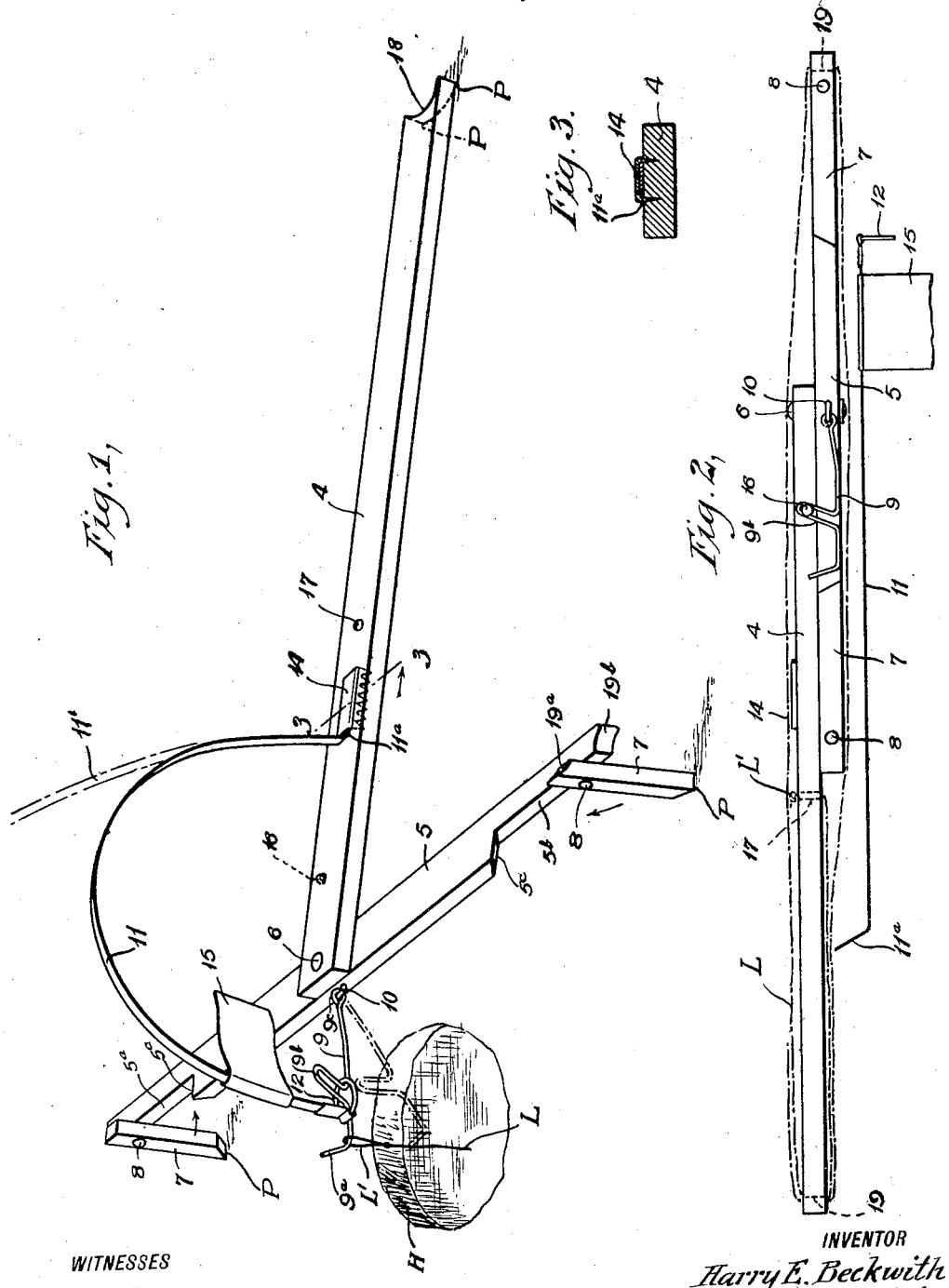
WITNESSES
Edw. Thorpe
INVENTOR
Harry E. Beckwith
BY
ATTORNEYS Patented Dec. 23, 1924.

1,520,556

UNITED STATES PATENT OFFICE.

HARRY E. BECKWITH, OF NORWICH, CONNECTICUT.

FISHING TILT.

Application filed February 28, 1923. Serial No. 621,823.

*To all whom it may concern:*

Be it known that I, HARRY E. BECKWITH, a citizen of the United States, and a resident of Norwich, in the county of New London and State of Connecticut, have invented a new and Improved Fishing Tilt, of which the following is a full, clear, and exact description.

This invention relates to fishing tackle, and more particularly aims to provide a new and improved tilt for ice fishing.

As is well known among anglers who follow the sport in the winter time or in cold regions when the pond, lake or river is covered with solid ice, some kind of a line-holder called a tilt is usually employed. Such tilt is an elongate structure, sometimes merely a pole, generally set at an oblique inclination to the horizontal to dispose its upper end over a hole cut through the ice and through which hole the rather short fish-line usually employed depends from a suitable connection to such upper end of the pole or the like. The lower end of the tilt must be rigidly mounted somehow, and where merely such a pole is the tilt as is most common and as has been preferable from the standpoints of light weight and ready portability, a second hole has to be cut through the ice or a rather deep well cut into the ice to receive the lower end of the pole. When the day is a little warm, the ice melts around the pole-anchoring hole and the pole sags and sometimes is in danger of being blown down in even a little wind. On the other hand, if the day is very cold, the sought-to-be-anchored end of the tilt will freeze in so hard that it sometimes may not be loosened at the end of the fishing without breaking some part. These troubles will be better appreciated when it is stated that tilts are usually made of very slender wooden strips generally 20" long, 1" wide and about ¼" thick.

As is also well-known, these previous tilts, whatever their type, and even when simplicity of construction, light weight, and ease of portability are sacrificed in an attempt to insure a comparatively secure anchorage of the tilt in the ice adjacent the main fishing hole, frequently are tipped or displaced by the strike-shock of a hooked fish, often to the extent of pulling a part of the tilt down through the main hole and submerging the same in the frigid water. On such an occurrence, there exists not only the possible chance of losing or injuring the tilt, but there usually results a subsequent coating of the submerged end of the tilt with ice, as a result of which the line will be prevented from running free in the hooking of the next fish.

The main object of the invention is to provide a new and improved fishing tilt, and one which will avoid all the disadvantages above indicated, and which in addition will be supported securely at all times on the surface of the ice, and yet without having to cut any holes through or dig any wells in the ice after the cutting out of the main fishing hole.

A further object of the invention is to provide such a tilt, and one wherein the same, when set up for fishing, is in effect really a tilt of the single-pole type.

Still a further object is to provide such a tilt, and one wherein the same will include an auxiliary trip device, preferably associated with an alarm device such that on the striking of a fish the trip device will operate by a movement relative to the other parts of the tilt, and will preferably thus operate also to release the alarm device.

Another object is to provide a tilt as above indicated, and one which has readily extensible parts, comprising preferably a single additional wooden member pivotally carried by the pole proper but itself pivotally carrying a pair of foot extensions at opposite ends,—for affording a transverse and cradling mount for the pole and so that the entire tilt is set in place merely by gravity, but very securely, as the result preferably of a three-point tread. Otherwise stated, a novel tripod structure is preferably provided when the new tilt is set in position for fishing.

Still another object is to provide a tilt as just characterized, and one wherein the same is exceedingly simple and inexpensive in construction, light in weight, and easily portable because instantaneously collapsible with its trip and other parts into practically a single slender pole-structure.

A further object is to provide a tilt as just above described, and one wherein such trip is of an improved type from the manufacturing and operative standpoints, and one also preferably so constructed that said trip itself may be set to perform the important function of holding locked together all the parts of the tilt when the latter is collapsed into such pole structure. In this connection, a further object of the invention is to provide, as a preferable construction, a trip formed of a single unitary piece of bent wire or the like.

Still a further object is to provide a tilt as just indicated, and one wherein there is associated with the trip a combined impositive latch and alarm signal, and, further, a signal device of this kind adapted automatically to act itself securely to hook a fish immediately when such fish strikes and co-incidentally with the simultaneous freeing of the trip from its latch and the giving of the alarm. In this connection, a further object of the invention is to provide, as a preferable construction, a combined latch and alarm as described, but one constructed in the main of a single unitary length of standard strip material.

Yet another object of the invention is to provide a tilt as above, and one including means for affording a readily detachable yet absolutely secure anchorage for one end of the latch and alarm device. In this connection, a further object of the invention is to provide, at the same time, a shape for said device such that the same when the trip is completely collapsed may be arranged in a position closely alongside the single slender pole-structure aforesaid, thereby to preserve the readily portable feature of the new appliance.

The invention will be best understood from a consideration of the following detailed description when taken in connection with the accompanying drawing forming part of this specification; with the understanding, however, that such drawing illustrates, merely by way of example, one possible embodiment of the invention, and that the invention is not confined to any strict conformity with the showing in the drawing, but may be changed and modified so long as such changes and modifications mark no material departure from the salient features of the invention as expressed in the appended claims.

In said drawing,

Fig. 1 is a perspective view of the new tilt, completely expanded and resting freely by gravity on the upper surface of the ice, but so as to suspend the fish-line through a fishing-hole in such ice.

Fig. 2 is a side elevation of the tilt completely collapsed into pole-like form for easy conveyance; and Fig. 3 is an enlarged view showing a detail of construction, the same being a transverse section taken on line 3—3 of Fig. 1.

The new tilt here includes, as best shown in Fig. 1, a pole or main bar 4, a transverse bar 5 pivoted at its center to one end of the main bar at 6, and a pair of depending legs 7 pivoted at their upper ends at 8 to the opposite ends of the transverse bar where the latter is cut away at $5^a$ and $5^b$. With the tilt thus in a tripod and securely set, the security of such set being aided by the contact points or edges marked P in Fig. 1, the upper end of the inclined main bar 4 is above and slightly to one side of the main fishing-hole indicated at H.

Through this hole depends the line L, the latter being looped at its upper end over an upturned terminal hook portion $9^a$ of a trip 9 formed here of a unitary length of wire bent also to provide a rather attenuated, obliquely offset, U-shaped hump $9^b$, and bent further to provide a terminal eye $9^c$ shackled by a staple 10 to the central point on the front face of transverse bar 5.

The combined alarm and impositive latch device for the trip 9 includes here merely a suitable length of steel leaf-spring material 11 pivotally carrying at one end a wire ring 12, and being bent straight at its other end as indicated at $11^a$ for frictional securement in, and hence ready detachability from a flat pocket afforded by an anchor-plate 14 on the upper face of main bar 4. This anchor-plate is desirably a sheet metal stamping having down-turned marginal portions provided with serrations as illustrated along their free edges so that the anchor-plate may be secured to the main bar by a hammer blow.

It will be understood that with the new tilt set up as arranged in Fig. 1, and with the parts in their full-line positions, that is, with ring 12 on spring 11 in latching engagement with hump $9^b$ of trip $9^a$, the tilt is supporting line L preparatory to the striking of a fish. It will equally be understood that when a fish strikes, the shock to the line L will be such that trip 9 will be sufficiently moved toward the broken-line position thereof to free its hump $9^b$ from the latch ring 12 on spring 11, whereupon, of course, such spring will fly up toward the broken-line position thereof indicated at 11'. To accentuate the alarm characteristic of such spring when thus released, the spring may further carry a flag 15.

Referring now to Fig. 2 where the new tilt is shown collapsed, it will be seen that, legs 7 having been folded up to contact their beveled free ends with the beveled shoulders $5^c$ of transverse bar 5 and hence to make a single pole-like structure of the same cross-sectional characteristic substantially from end to end, the thus collapsed transverse bar 5 has been further turned about pivot 6 to lie parallel with main bar 4; the trip 9 has been set as the result of engaging its hump $9^b$ with a stud 16 on a side of the main member to act as a lock to hold members 4 and 5 of the legs 7 underlying member 4 as collapsed; line L has been drawn through a hole 17 in main bar 4 to locate its looped end L' as shown; such line L has been there-upon wrapped around the ends and lengthwise of the collapsed device, to prevent tangling; and the spring 11 has been laid closely alongside the parallel members 4 and 5. It will further be seen that due to a scallop 18 at the free end of main bar 4, and a similar scallop formed at 19 in Fig. 2 as the result of rounding the upper end of a leg 7 and the adjacent end of cross-bar 5 as marked 19ª and 19ᵇ in Fig. 1, the wrapping up of the line 11 as just described is facilitated, and also the leg 7 at the left of Fig. 2 is thereby held against flopping loose.

From the foregoing it will be observed that I have illustrated and described herein, as an illustrative example of one of the various possible ways of carrying out the invention, an exceedingly simple and practical embodiment thereof, and one well calculated to attain all the various objects hereinabove indicated.

I claim:

1. A fishing tilt, comprising a support, a spring signal member having one end secured to the support, a trip-member pivotally mounted at one end on the support and having at its free end means for attaching a line thereto, and interengaging means on the end of the signal member and on the trip intermediate of its ends for holding said parts in set position, said means being disengaged by a pull on the line by a fish.

2. A fishing tilt, comprising a support, a spring signal member having a pivoted ring at its free end, and a trip pivoted to the support and provided with a hump intermediate of its ends projecting through the ring of the signal member and with means at its free end for attachment of a line thereto.

3. In a fishing tilt, a support formed of a main bar, a transverse bar pivoted intermediate of its ends to one end of the main bar, and legs pivoted to the ends of the transverse bar, whereby the legs can be folded on the transverse bar and said transverse bar folded on the main bar with one end projecting from one end of the main bar when not in use.

4. In a fishing tilt, a support formed of a main bar having one end recessed, a transverse bar pivoted at its center of length to the end of the main bar remote from its recessed end, said transverse bar having one side cut away at each end, and legs pivoted to said ends to fold in the cut away portions of the bar, the upper end of one leg and the end of the bar being reduced to form a recess when the said leg is folded.

5. In a fishing tilt, a supporting frame having two bars pivoted together to fold one upon the other, one being provided with a projection, a spring signal member mounted on one of the bars and having a ring at one end and a trip pivoted to the other bar and having a hook at its free end and intermediate of its ends a hump engaging said ring, said hump when the parts are folded engaging the said projection to lock the parts together.

6. A fishing tilt, comprising bars pivoted together to fold one upon the other and when folded a portion of one bar projects beyond the end of the other bar, folding legs mounted on one of the bars, a spring signal member removably mounted on one of the said bars, a pivoted trip having at its free end means for the attachment of a line thereto, and interengaging means on the trip and the free end of the signal member.

HARRY E. BECKWITH.